United States Patent [19]

Cobb

[11] Patent Number: 4,523,524
[45] Date of Patent: Jun. 18, 1985

[54] LOW COST ANTITANK ROCKET MOTOR STRUCTURE

[75] Inventor: Bernie J. Cobb, Huntsville, Ala.

[73] Assignee: The United States of America as represented by the Secretary of the Army, Washington, D.C.

[21] Appl. No.: 462,509

[22] Filed: Jan. 31, 1983

[51] Int. Cl.³ .............................................. F42B 13/28
[52] U.S. Cl. .................................................. 102/374
[58] Field of Search ................. 60/253, 255, 256, 263; 102/374, 380

[56] References Cited

U.S. PATENT DOCUMENTS

| | | | |
|---|---|---|---|
| 3,093,964 | 6/1963 | Hausmann | 60/253 |
| 3,722,413 | 3/1973 | Narvesen et al. | 102/380 |
| 3,735,985 | 5/1973 | Layer et al. | 102/374 |
| 4,054,029 | 10/1977 | Sayles | 60/253 |
| 4,231,293 | 11/1980 | Dahn et al. | 102/494 |

FOREIGN PATENT DOCUMENTS

| | | | |
|---|---|---|---|
| 1126683 | 3/1962 | Fed. Rep. of Germany | 60/255 |
| 97052 | 6/1982 | Japan | 60/255 |
| 0085039 | 12/1956 | Netherlands | 60/255 |

Primary Examiner—Charles T. Jordan
Attorney, Agent, or Firm—Anthony T. Lane; Robert P. Gibson; James T. Deaton

[57] ABSTRACT

A rocket motor structure which includes a head closure and an aft section with a multiplicity of composite tubes mounted therebetween to define a multiplicity of small chambers for providing an overall rocket motor and in which the aft section includes a nozzle structure for the composite tubes and provides attached fins for guiding and stabilizing the structure. Also, the nozzle structure can be provided with an igniter mounted in the nozzle.

4 Claims, 4 Drawing Figures

LOW COST ANTITANK ROCKET MOTOR STRUCTURE

DEDICATORY CLAUSE

The invention described herein may be manufactured, used, and licensed by or for the Government for governmental purposes without the payment to me of any royalties thereon.

BACKGROUND OF THE INVENTION

In the past, solid propellant rocket motor cases have utilized higher cost single chamber rocket motor cases that are generally made of fiber glass and aluminum or cases of maraging steel. These rocket motor cases are more expensive than is desirable and therefore, there is a need for a rocket motor case that can be made much less costly.

Therefore, it is an object of this invention to provide a rocket motor case that utilizes many small, inexpensive parts to form the rocket motor case.

Another object of this invention is to provide a rocket motor case that includes a structure in which fins can be pivotably mounted relative to the rocket motor structure.

Still another object of this invention is to provide a rocket motor case that can be made up of many small and inexpensive tubes as parts of the rocket motor case.

Other objects and advantages of this invention will be obvious to those skilled in this art.

SUMMARY OF THE INVENTION

In accordance with this invention, a rocket motor case is provided that includes a head closure and an aft section with a multiplicity of composite tubes mounted relative to the head closure and the aft section with the aft section including a nozzle structure and with a clamping means for clamping the aft section and the head closure so as to hold the components in an assembled relationship to form a multitube structure for a rocket motor with an attached nozzle.

BRIEF DESCRIPTION OF THE PREFERRED EMBODIMENT

Figure 1:
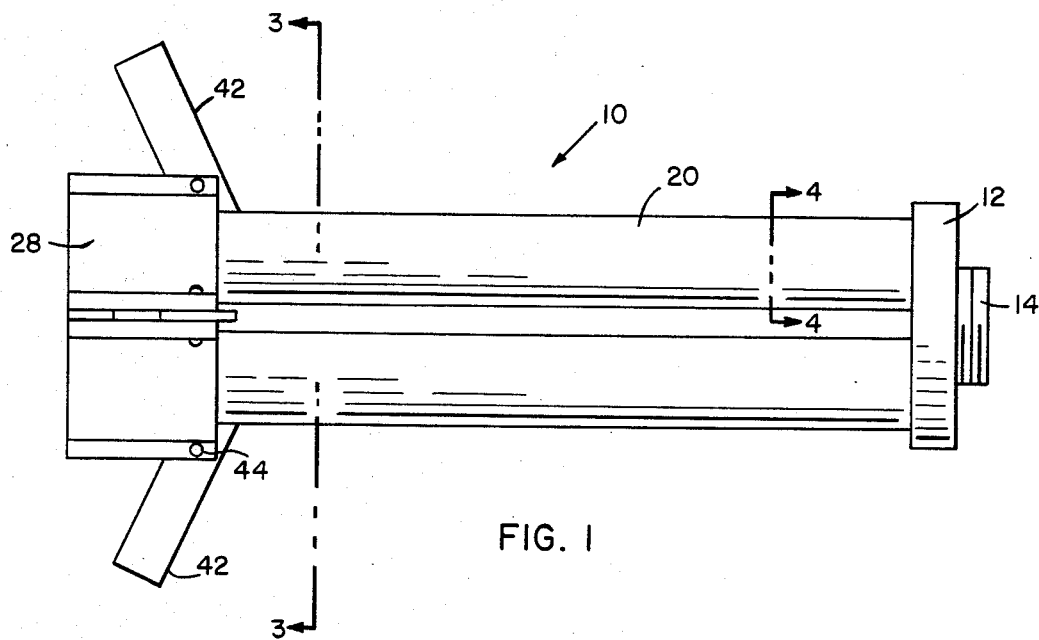
FIG. 1 is a plan view of a rocket motor structure in accordance with this invention.
Figure 2:
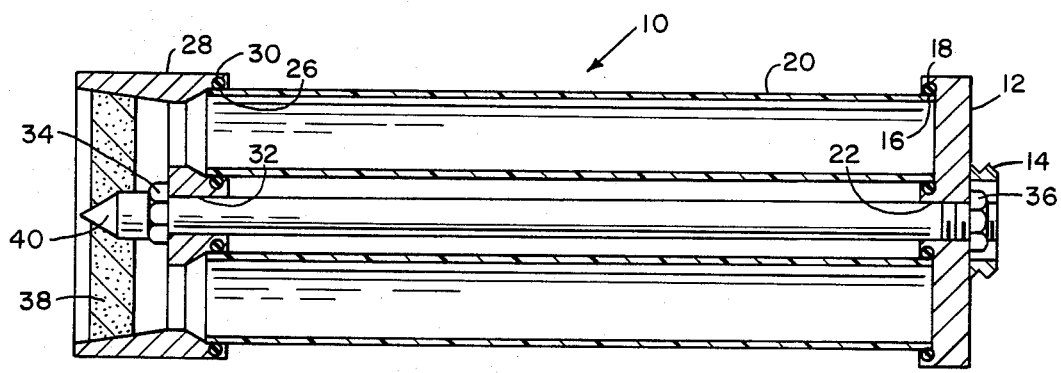
FIG. 2 is a sectional view of the rocket motor structure in accordance with this invention and with the solid propellant omitted.
Figure 3:
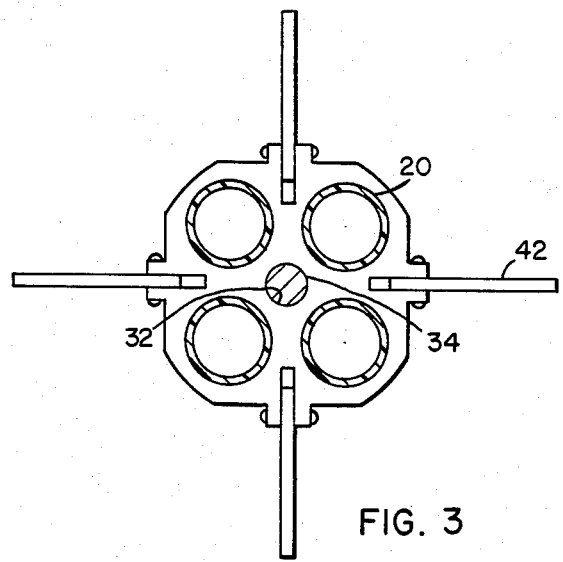
FIG. 3 is a sectional view along line 3—3 of FIG. 1 and with the solid propellant omitted.
Figure 4:
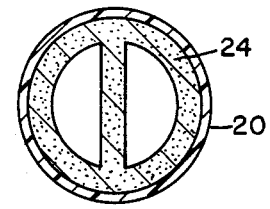
FIG. 4 is an enlarged sectional view along line 4—4 of FIG. 1 and illustrating the shape of the solid propellant within a tube of the rocket motor.

Referring now to the drawing, a rocket motor 10 includes a forward head closure 12 that has a threaded warhead attachment means 14 for attaching a warhead section to the rocket motor structure. Forward head closure 12 also has four cylinderical openings 16 with O-ring seals 18 or other conventional sealing means for sealing between openings 16 and thin wall propellant tubes 20. Tubes 20 are preferably made of a composite material such as graphite, fiber glass or other similar materials that can be wound into the shape of a tube and have the fibers bonded together to form a cheap but yet a light and rugged structure sufficient for providing the necessary strength for solid propellant rocket motor use. Forward head closure 12 also has an opening 22 therethrough for accommodating securing means. Each of tubes 20 has a conventional solid propellant 24 of substantially constant webb thickness and in a configuration similar to that illustrated in FIG. 4. The aft end of tubes 20 are mounted in openings 26 of aft nozzle structure 28 and O-rings or other conventional sealing means seal between the aft ends of tubes 20 and aft nozzle structure 28. Aft nozzle structure 28 can have an individual nozzle for each tube as illustrated or an overall nozzle of the four tubes can be made into a central nozzle within the aft nozzle structure if desired. Aft nozzle 28 has an opening 32 therethrough and bolt 34 is placed through opening 32 of aft nozzle structure 28 and opening 22 in forward head closure 12 and a nut 36 is used to clamp the forward head closure 12 and aft nozzle structure 28 relative to tubes 20 to form an integral rocket motor structure. An igniter 38 is mounted in the aft nozzle structure to close and seal off the opening in the nozzle structure and to inclose the propellant within tubes 20 from the atmosphere. Igniter 38 can be a single plug or a donut shape with a streamlined portion 40 attached to the head of bolt 34 as illustrated. Also, aft nozzle structure 28 has four fins 42 that are pivotably connected to nozzle structure 28 at 44 as illustrated. Fins 42 are adapted to be folded between tubes 20 before launching of the rocket motor and are adapted to be actuated to the position illustrated in FIG. 1 in a conventional manner such as by spring actuating means. It is also pointed out that four tubes 20 have been illustrated, however the structure could be made with more tubes. Also, some of the tubes could be provided with slower burning propellant if desired to cause these tubes to act with their propellant as a sustainer motor.

In operation, with the rocket motor assembled, and ready for launching in a launch tube, igniter 38 is ignited in a conventional manner to simultaneously ignite solid propellant 24 and cause the rocket motor and a warhead attached at 14 to be launched. As the rocket motor is launched from the launch tube, fins 42 are biased by spring means in a conventional manner to the position illustrated to stabilize flight of the missile.

I claim:

1. A rocket motor structure comprising a forward head closure having means on one side for attaching a warhead and openings on the opposite side for receiving a multiplicity of rocket tubes, an aft nozzle structure having a multiplicity of openings at one end, and a multiplicity of rocket tubes mounted at their opposite ends in said openings of said aft nozzle structure and said forward head closure, and a bolt securing means extending between said aft nozzle structure and said head closure and clamping said tubes between said forward head closure and said aft nozzle structure, and said multiplicity of tubes each having a solid propellant mounted therein.

2. A rocket motor structure as set forth in claim 1, wherein said forward head closure and said aft nozzle structure have sealing means for sealing around the ends of said tubes, and wherein said aft nozzle structure has a plurality of fins pivotably attached thereto.

3. A rocket motor structure as set forth in claim 2, wherein said aft nozzle structure has a central exhaust opening with an igniter closing said central exhaust opening.

4. A rocket motor structure as set forth in claim 1, wherein said multiplicity of tubes are each made of a composite structure of graphite fiber.

* * * * *